Feb. 20, 1940.   J. M. TALKINGTON   2,191,241
LOOSE MATERIAL DISPENSING APPARATUS
Filed Aug. 25, 1938   5 Sheets-Sheet 1

Inventor
Jesse M. Talkington,

By Clarence A. O'Brien
and Hyman Berman
Attorneys

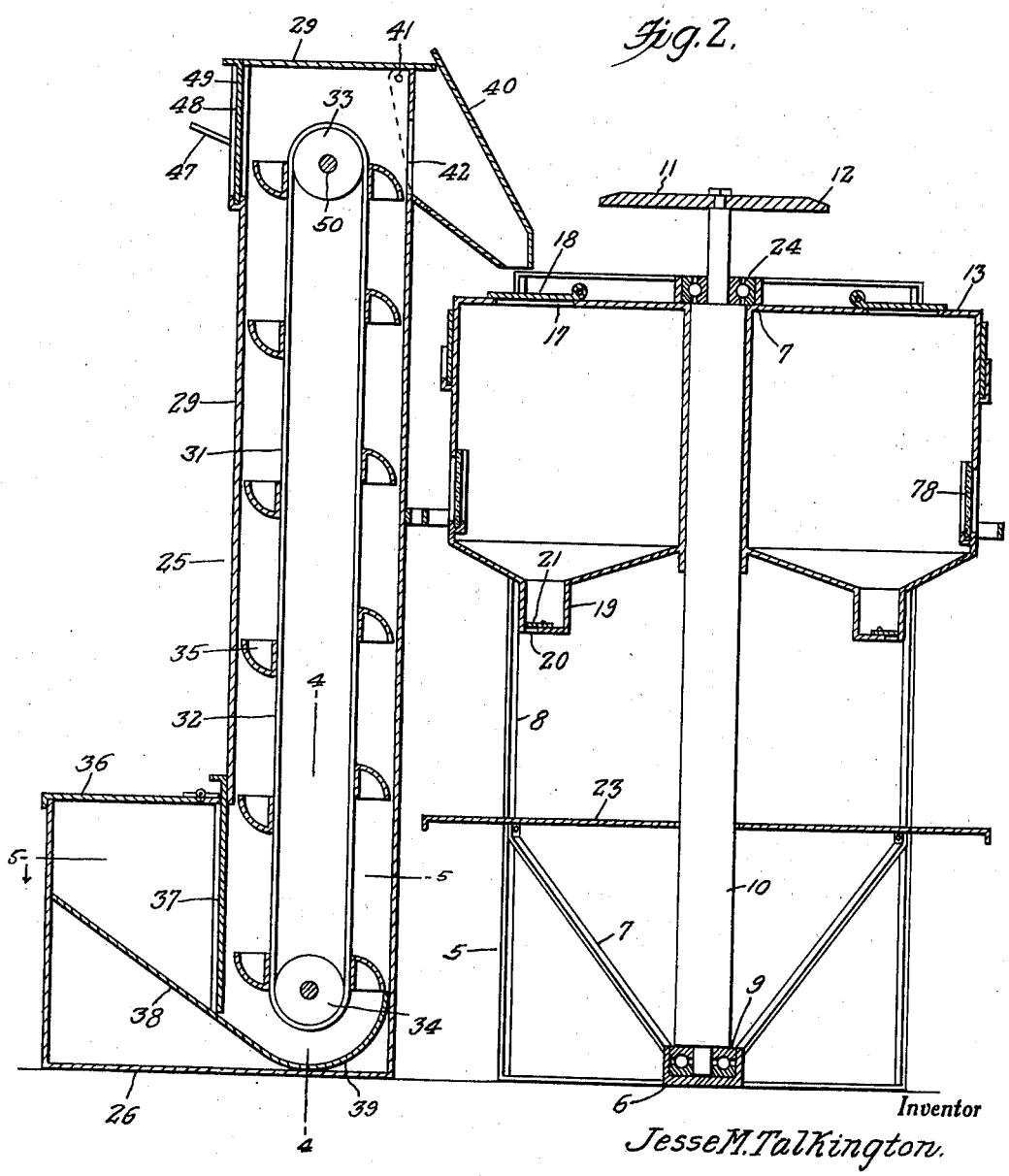

Feb. 20, 1940.   J. M. TALKINGTON   2,191,241
LOOSE MATERIAL DISPENSING APPARATUS
Filed Aug. 25, 1938   5 Sheets-Sheet 3
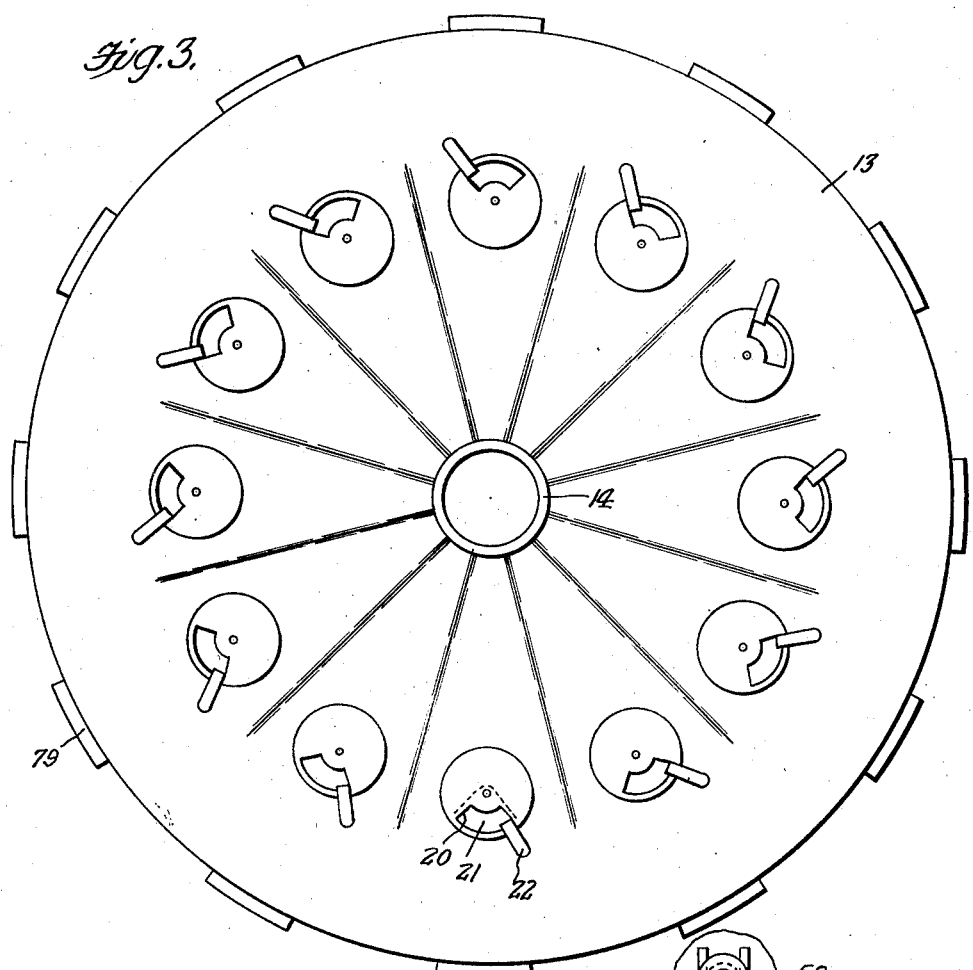
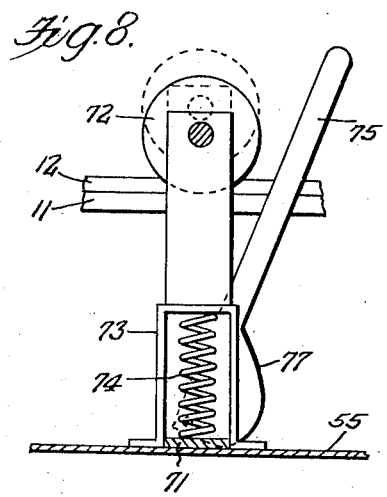
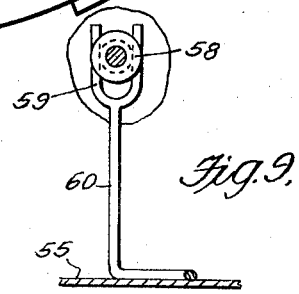
Inventor
Jesse M. Talkington.
By Clarence A. O'Brien
and Hyman Berman
Attorneys Feb. 20, 1940.　　　J. M. TALKINGTON　　　2,191,241
LOOSE MATERIAL DISPENSING APPARATUS
Filed Aug. 25, 1938　　　5 Sheets-Sheet 4
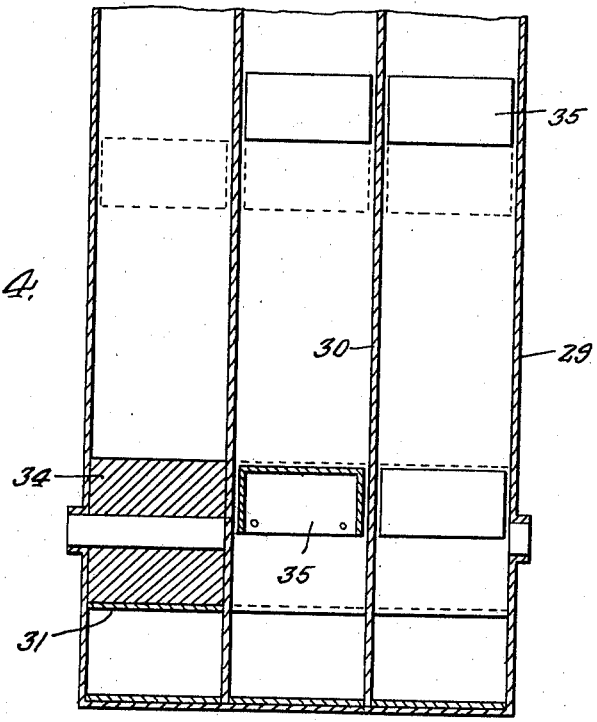
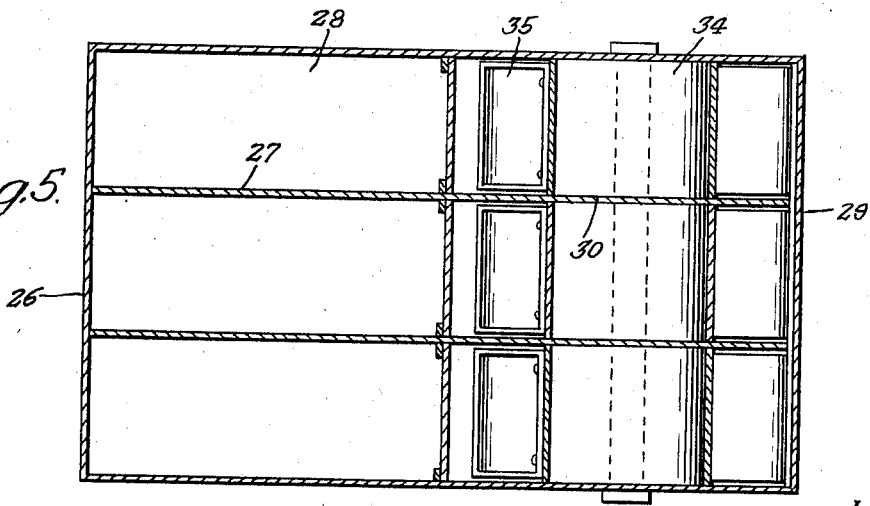
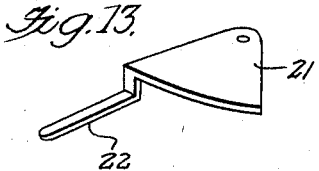
Inventor
Jesse M. Talkington.
By Clarence A. O'Brien
and Hyman Berman
Attorneys Feb. 20, 1940.　　J. M. TALKINGTON　　2,191,241
LOOSE MATERIAL DISPENSING APPARATUS
Filed Aug. 25, 1938　　5 Sheets-Sheet 5
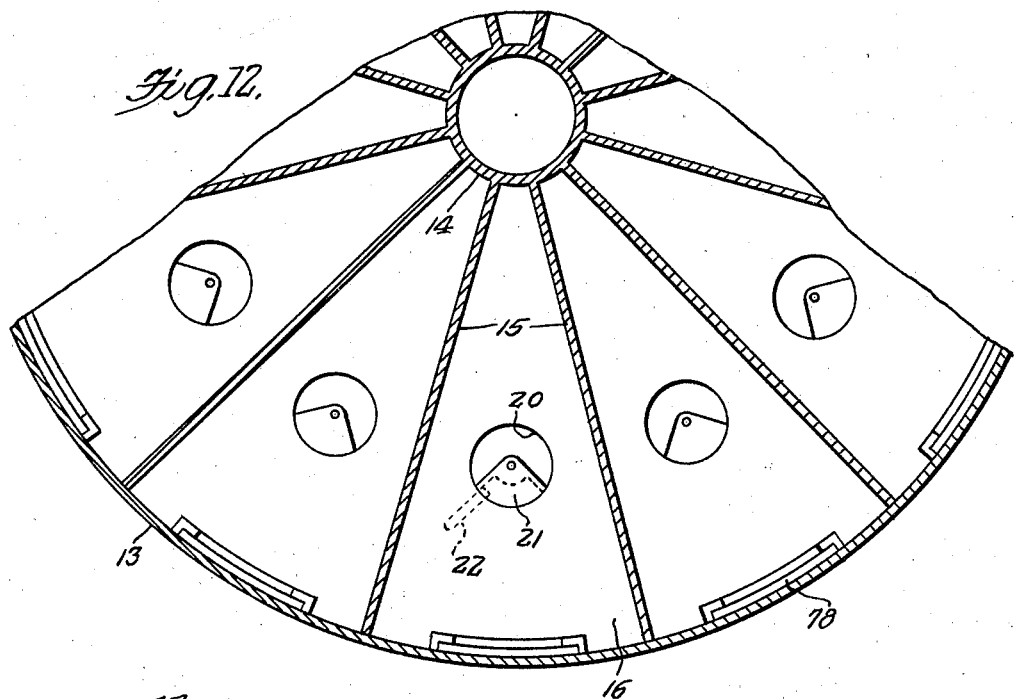
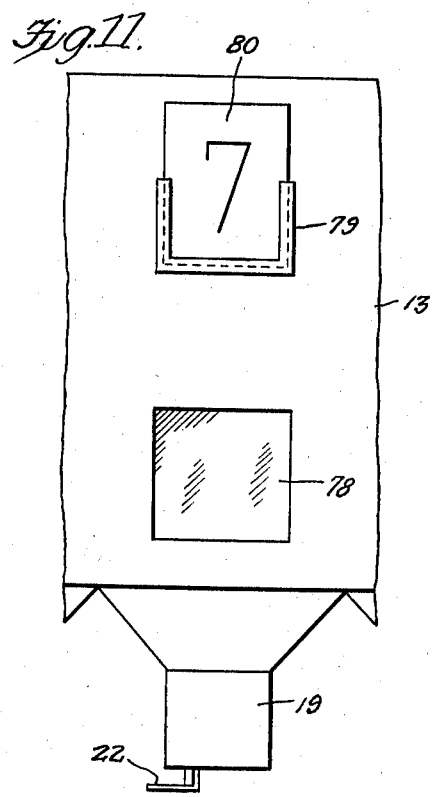
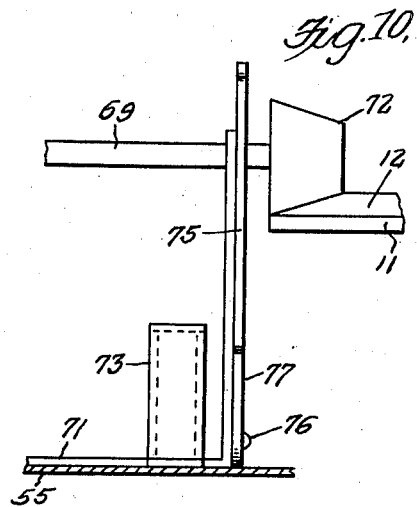
Inventor
Jesse M. Talkington,
By Clarence A. O'Brien
and Hyman Berman
Attorneys Patented Feb. 20, 1940

2,191,241

UNITED STATES PATENT OFFICE 2,191,241

LOOSE MATERIAL DISPENSING APPARATUS

Jesse M. Talkington, Dover, Ark.

Application August 25, 1938, Serial No. 226,805

5 Claims. (Cl. 198—69)

The present invention relates to apparatus for dispensing loose material, such as used in grocery stores and the like, and has for its primary object to provide a plurality of dispensing hoppers rotatably mounted above a platform upon which weighing scales may be positioned for weighing the material as the same is discharged from the hopper into a suitable receptacle, together with means for replenishing the supply of material to the hoppers from a supply bin and including an elevator for raising the material from the bin to the upper part of the hopper and also providing motor driven means for the elevator as well as for the group of hoppers to move the same into the desired dispensing position.

The invention further embodies the provision of control means between the motor and the elevator as well as independent control means between the motor and the rotatable hoppers.

A still further object is to provide an apparatus of this character of simple and practical construction, which is efficient and reliable in performance, relatively inexpensive to manufacture and maintain in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which Figure 1 is a top plan view.

Figure 2 is a vertical sectional view taken substantially on a line 2—2 of Figure 1.

Figure 3 is a bottom plan view of the rotatable cylinder containing the hoppers.

Figure 4 is a fragmentary vertical sectional view through the elevator taken substantially on a line 4—4 of Figure 2.

Figure 5 is a horizontal sectional view through the elevator taken substantially on a line 5—5 of Figure 2.

Figure 8 is a fragmentary sectional view taken substantially on a line 8—8 of Figure 1.

Figure 9 is a similar view taken substantially on a line 9—9 of Figure 1.

Figure 10 is a similiar view taken substantially on a line 10—10 of Figure 1.

Figure 11 is a fragmentary front elevational view of one of the hoppers.

Figure 12 is a fragmentary horizontal sectional view of the rotatable cylinder for the hoppers, and Figure 13 is a perspective view of one of the pivoted discharge gates for the hoppers.

Figure 1:
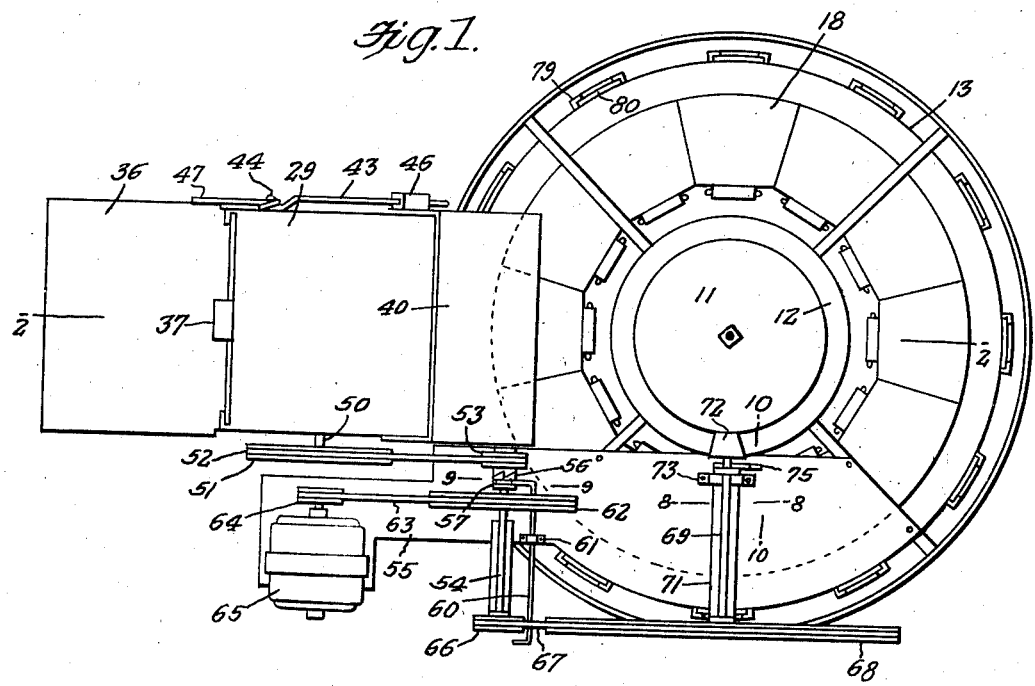

Referring now to the drawings in detail, wherein for the purpose of illustration I have disclosed a preferred embodiment of the invention, the numeral 5 designates a supporting frame having a socketed base 6 from which inclined brace members 7 extend for attaching to the upright members 8 of the frame, the base 6 providing a housing for a ball bearing assembly 9 and upon which is rotatably supported the lower end of a vertical shaft 10, the upper end of the shaft having a disk 11 secured thereto and provided with a beveled edge 12 as clearly shown in Figure 2 of the drawings.

Secured to the shaft 10 is a cylinder designated generally by the number 13, the central portion of the cylinder having a sleeve 14 extending vertically therethrough and through which the shaft 10 is inserted, and the cylinder is further provided with a plurality of radially extending partitions 15 defining a plurality of hoppers 16 within the cylinder. Each of the hoppers is provided with an opening 17 in the top thereof over which is positioned a hinged cover 18 and the bottom of each hopper is provided with a discharge neck 19 depending therefrom, the bottom portion of each neck having a discharge opening 20 controlled by a pivoted closure 21 having a manipulating handle 22.

Supported on the frame 5 beneath the hoppers is a platform 23 upon which may be positioned a weighing scale (not shown) for weighing the material as the same is discharged from the hoppers. A ball-bearing assembly 24 is also provided for the upper portion of the shaft 10.

Positioned adjacent the frame 5 and cylinder 13 is an elevator mechanism which includes a housing designated generally at 25 and embodying a base portion 26 having a plurality of vertical partitions 27 therein forming bins 28. Rising from the base 26 is an elevator shaft 29 likewise having a pluralty of vertical partitions 30 therein and within each of which is arranged an elevator designated generally at 31 and embodying a belt 32 trained over upper and lower pulleys 33 and 34 respectively, and to which belt is secured a plurality of buckets 35.

The top of each of the bins 28 is provided with a hinged lid 36 and the rear portion of each bin is provided with a vertically slidable gate 37 separating the front portion of the bin from the bottom of the communicating elevator shaft, as will be observed from an inspection of Figure 2 of the drawings. The bottom 38 of the bin is inclined and extends into the bottom of the elevator shaft where the same is curved as shown at 39 in concentric relation with respect to the axis of the lower pulley 34 in order that the buckets 35 will have a substantially close fit with the curved bottom to more effectively pick up the material therein for raising the same to the top of the elevator shaft.

A discharge chute 40 is pivotally secured as at 41 to the upper portion of the elevator shaft 29, the discharge end of the chute terminating at a point immediately above the lid 18 of the hoppers 16, as the same are moved into position beneath the chute, and the adjacent wall of each of the elevator shafts is provided with a discharge opening 42 by means of which the material from the buckets 35 may be discharged into the chute 40.

Figure 6:
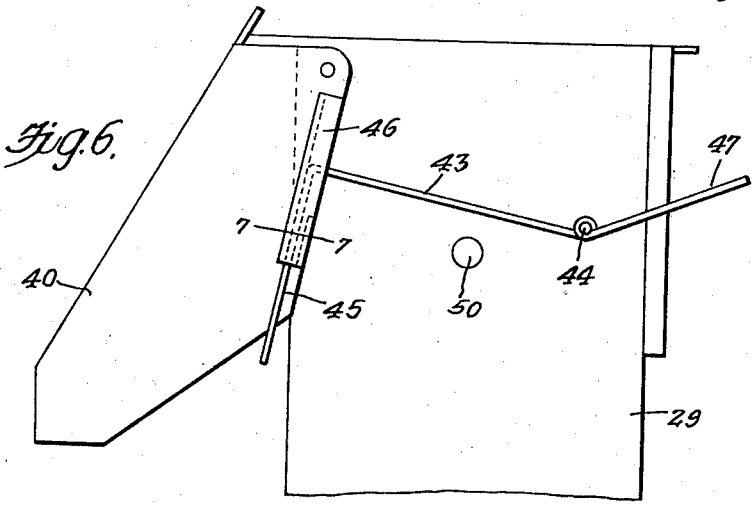
Figure 6 is a fragmentary detail in elevation of the upper end of the elevator showing the pivoted chute.
Figure 7:
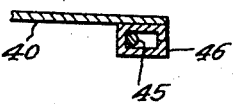
Figure 7 is a sectional view taken substantially on a line 7—7 of Figure 6.

The chute 40 is releasably held in a downwardly inclined position as shown in Figures 2 and 6, and may be raised by means of a rod 43 pivoted intermediate its ends as at 44 to the side of the elevator shaft 29, one end of the rod being bent angularly as shown at 45 and inserted in a socket 46 formed at one side of the chute. The opposite end of the rod constitutes a manipulating handle as shown at 47.

The upper portion of the elevator shaft 29 is also provided with an opening 48 having a door 49 slidably positioned therein to afford access to the interior of the elevator shaft for inspection or repair purposes.

The upper shaft 50 for the pulleys 33 projects outwardly of the elevator shaft and is provided with a pulley 51 over which is trained a belt 52 driven from a pulley 53 idly mounted on a shaft 54 journaled in a platform 55 above the cylinder 13, as clearly shown in Figure 1 of the drawings.

Formed on the pulley 53 is a clutch member 56 engageable by a companion clutch member 57 rotatable with and slidably mounted on the shaft 54. The clutch member 57 is formed with a clutch collar 58 with which a yoke 59 is engaged and formed on one end of a control lever 60 slidably mounted in a bracket 61 secured to the platform 55.

Also keyed on the shaft 54 is a pulley 62 driven by a belt 63 from a pulley 64 on one end of an electric motor 65.

To the shaft 54 is also keyed a drive pulley 66 having a belt 67 trained thereon for driving a pulley 68 keyed on a shaft 69. The shaft 69 is journaled in a U-shaped bracket 71 and is provided at one end with a friction cone 72 engageable with the beveled edge 12 of the disk 11.

Secured to and rising from the platform 55 is an inverted U-shaped bracket 73 through which the bracket 71 is inserted and within which is positioned an expansible coiled spring 74 bearing against the bracket 71 and the top of the bracket 73 to yieldably urge the first named bracket downwardly, whereby to maintain the cone 72 in engagement with the disk 11.

A manipulating handle 75 is pivoted adjacent one end, as at 76, to one of the legs of the bracket 71, the handle, adjacent its pivoted end being formed with a cam edge 77 adapted to bear against the platform 55 to raise the bracket 71 against the tension of the spring 74 whereby to disengage the cone 72 from the disk 11. In this manner it will be apparent that the cylinder 13 may be rotatably operated by the motor 65 when desired, or may be disengaged therefrom through the manipulation of the handle 75.

Each of the hoppers 16 is provided with a window opening 78 adjacent its lower portion and adjacent the upper portion of each hopper is a bracket 79 for holding an identifying card or label 80.

In the operation of the device it will be apparent that the cylinder may be rotated to bring the desired hopper either into position for conveniently discharging the contents thereof, or for filling the hoppers from the elevator and at the same time the elevator may be operatively controlled to raise the material from the bins 5 for discharging the same into the desired hopper.

It is believed the details of construction, advantages and manner of operation of the device will be readily understood from the foregoing without further detailed explanation.

Having thus described the invention, what I claim is—

1. In combination, a frame, a vertical shaft journalled in the frame, a plurality of hoppers mounted for rotation on the shaft, an elevator for raising material to a point above the hoppers and common operating means for the elevator and for the hoppers for moving the latter into a position to receive the material from the elevator and means for independently controlling the operation of the elevator and said rotary element.

2. In combination, a frame, a vertical shaft journalled in the frame, a plurality of hoppers mounted for rotation on the shaft, an elevator for raising material to a point above the hoppers, power drive means for the elevator and the cylinder for moving the hoppers into a position for receiving the material from the elevator, clutch control means between the elevator and the drive means, a friction drive connection between the drive means and the cylinder and means for disengaging said friction drive connection.

3. In combination, a vertical shaft having a cylinder secured thereto, said cylinder embodying a plurality of hoppers, a friction driven disk secured to the shaft, a power driven shaft having a friction drive cone secured thereto, a movable bracket for said driven shaft, spring means for urging the cone into engaged position and manual operable means for disengaging the cone from the disk.

4. In combination, a vertical shaft having a cylinder secured thereto, said cylinder embodying a plurality of hoppers, a friction driven disk secured to the shaft, a power driven shaft having a friction drive cone secured thereto, a movable bracket for said driven shaft, spring means yieldably maintaining the bracket in a position for engaging the cone with the disk and a cam device for moving the bracket to disengage the cone from the disk.

5. In combination, a frame, a vertical shaft journalled in the frame, a plurality of hoppers mounted for rotation on the shaft, an elevator for raising material to a point above the hoppers, a platform above the cylinder for supporting a motor, a horizontal shaft supported on the platform and operatively connected to the motor, a drive connection between the horizontal shaft and the elevator, clutch control means for said drive connection, a second horizontal shaft supported on the platform and operatively connected with the first horizontal shaft, a drive connection between the second horizontal shaft and the vertical shaft for moving the hoppers into a position for receiving material from the elevator and clutch control means for the last named drive connection.

JESSE M. TALKINGTON.